US009367529B1

(12) United States Patent
Collins

(10) Patent No.: US 9,367,529 B1
(45) Date of Patent: Jun. 14, 2016

(54) SELECTING CONTENT BASED ON ENTITIES

(71) Applicant: Google Inc., Mountain View, CA (US)

(72) Inventor: Alexander Collins, Denver, CO (US)

(73) Assignee: Google Inc., Mountain View, CA (US)

( * ) Notice: Subject to any disclaimer, the term of this patent is extended or adjusted under 35 U.S.C. 154(b) by 245 days.

(21) Appl. No.: 13/955,261

(22) Filed: Jul. 31, 2013

(51) Int. Cl.
G06F 17/00 (2006.01)
G06F 17/22 (2006.01)

(52) U.S. Cl.
CPC .................... G06F 17/2247 (2013.01)

(58) Field of Classification Search
None
See application file for complete search history.

(56) References Cited

U.S. PATENT DOCUMENTS

| 7,831,685 | B2 | 11/2010 | Dai et al. | |
|---|---|---|---|---|
| 7,849,104 | B2 | 12/2010 | Sun et al. | |
| 7,987,194 | B1 | 7/2011 | Walker et al. | |
| 8,122,016 | B1 | 2/2012 | Lamba et al. | |
| 8,171,021 | B2 | 5/2012 | Guha et al. | |
| 8,364,525 | B2 | 1/2013 | Kothiwal et al. | |
| 2006/0004732 | A1* | 1/2006 | Odom | 707/3 |
| 2006/0015401 | A1* | 1/2006 | Chu | G06Q 30/02 705/301 |
| 2006/0206479 | A1 | 9/2006 | Mason | |
| 2006/0206516 | A1* | 9/2006 | Mason | G06Q 30/02 |
| 2007/0124425 | A1* | 5/2007 | Gross | 709/217 |
| 2008/0027798 | A1* | 1/2008 | Ramamurthi | G06Q 30/02 705/14.47 |
| 2008/0243797 | A1* | 10/2008 | Song | G06F 17/3089 |
| 2009/0112844 | A1* | 4/2009 | Oro | G06F 17/30864 |
| 2011/0035281 | A1* | 2/2011 | Bernstein | G06Q 30/02 705/14.54 |
| 2011/0196737 | A1* | 8/2011 | Vadlamani | G06F 17/30864 705/14.49 |
| 2011/0258032 | A1* | 10/2011 | Vadlamani | G06F 17/30699 705/14.42 |
| 2013/0018723 | A1 | 1/2013 | Khanna | |
| 2013/0091013 | A1 | 4/2013 | Wang et al. | |
| 2014/0278983 | A1* | 9/2014 | Reinshagen | G06Q 30/0256 705/14.54 |

FOREIGN PATENT DOCUMENTS

EP   1589443   10/2005

OTHER PUBLICATIONS

Broder et al., "Search Advertising using Web Relevance Feedback," ACM 2008, 1013-1022.
Joshi et al., "Contextual Advertising through Entity Extraction," International Journal of Engineering and Advanced Technology (IJEAT), 2(3):579-582, Feb. 2013.

* cited by examiner

Primary Examiner — Keith Bloomquist
(74) Attorney, Agent, or Firm — Fish & Richardson P.C.

(57) ABSTRACT

Methods, systems, and apparatus include computer programs encoded on a computer-readable storage medium for providing content to a user. A method includes: identifying a first resource, the first resource including one or more links to second, other resources and at least one slot for filling with third party content, wherein first selection criteria are associated with a first slot of the at least one slots; determining for at least one of the second other resources entities associated therewith, including evaluating a page associated with the second other resource to identify entities that are associated with content presented on the page; using the determined entities to either augment or filter the first selection criteria producing enhanced selection criteria; and determining one or more content items for presentation to a user in the first slot, wherein determining includes using the enhanced selection criteria to identify the one or more content items.

16 Claims, 5 Drawing Sheets

SELECTING CONTENT BASED ON ENTITIES

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Slots can be allocated to content sponsors through a reservation system or an auction. For example, content sponsors can provide bids specifying amounts that the sponsors are respectively willing to pay for presentation of their content. In turn, a reservation can be made or an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a method for providing content to a user. A method comprises: identifying a first resource, the first resource including one or more links to second other resources and at least one slot for filling with third party content, wherein first selection criteria are associated with a first slot of the at least one slots, the first selection criteria being used to determine which third party content to be included in the first slot from an inventory of available third party content items; determining for at least one of the second other resources entities associated therewith, including evaluating a page associated with the second other resource to identify entities that are associated with content presented on the page; using the determined entities to either augment or filter the first selection criteria producing enhanced selection criteria; and determining one or more content items for presentation to a user in the first slot, wherein determining includes using the enhanced selection criteria to identify the one or more content items.

In general, another aspect of the subject matter described in this specification can be implemented in computer program products. A computer program product is tangibly embodied in a computer-readable storage device and comprises instructions. The instructions, when executed by a processor, cause the processor to: identify a first resource, the first resource including one or more links to second other resources and at least one slot for filling with third party content, wherein first selection criteria are associated with a first slot of the at least one slots, the first selection criteria being used to determine which third party content to be included in the first slot from an inventory of available third party content items; determine for at least one of the second other resources entities associated therewith, including evaluating a page associated with the second other resource to identify entities that are associated with content presented on the page; use the determined entities to either augment or filter the first selection criteria producing enhanced selection criteria; and determine one or more content items for presentation to a user in the first slot, wherein determining includes using the enhanced selection criteria to identify the one or more content items.

In general, another aspect of the subject matter described in this specification can be implemented in systems. A system includes an entity identifier, a criteria enhancer, and a content selector. The entity identifier is configured to: identify a first resource, the first resource including one or more links to second other resources and at least one slot for filling with third party content, wherein first selection criteria are associated with a first slot of the at least one slots, the first selection criteria being used to determine which third party content to be included in the first slot from an inventory of available third party content items; and determine for at least one of the second other resources entities associated therewith, including evaluating a page associated with the second other resource to identify entities that are associated with content presented on the page. The criteria enhancer is configured to use the determined entities to either augment or filter the first selection criteria producing enhanced selection criteria. The content selector is configured to determine one or more content items for presentation to a user in the first slot, wherein determining includes using the enhanced selection criteria to identify the one or more content items.

These and other implementations can each optionally include one or more of the following features. The selection criteria can include one or more keywords associated with content included in the first resource and filtering or augmenting can include filtering out at least one of the one or more keywords or adding at least one keyword to the one or more keywords. Entities for all of the second other resources can be determined and a predetermined number of entities can be determined based on entities associated with all of the second other resources. Determining entities for the at least one second other resource can include determining a predetermined number of entities. The entities associated with the at least one second other resource can be filtered to produce a filtered set of entities. Using the determined entities can include using only the filtered set of entities to augment or filter the selection criteria. Augmenting can include adding one or more of the entities of the determined entities to the selection criteria prior to using the enhanced selection criteria to determine the one or more content items. Filtering can include removing an entity that is explicitly included in the selection criteria prior to using the enhanced selection criteria to determine the one or more content items. Determining one or more content items can include determining one or more advertisements that are targeted to an entity in the determined entities. The selection criteria can be specified by an entity associated with the first resource, derived based on content that is included in the first resource, or both. The associated entities can be derived from a URL associated with the at least one second other resource.

Particular implementations may realize none, one or more of the following advantages. Content that is relevant to entities included in resources linked to (or from) a resource can be presented along with the resource. Selection criteria for a content slot included in a resource can be modified based on entities that are associated with other resources that are linked to (or from) the resource.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A resource, such as a web page, can include one or more links to other resources. The resource can also include one or more slots that are designated to be filled with third party content. The slots can be associated with selection criteria. The resources that are linked to by the resource can be evaluated to determine one or more entities that are associated with one or more of the linked-to resources. The determined entities can be used to augment and/or filter the selection criteria for a slot to produce enhanced selection criteria. The enhanced selection criteria can be used to determine a content item for the slot. The content item can be provided to a user device, for presentation in the slot along with the resource. In some implementations, other resources (e.g., sourcing resources) can be evaluated to augment and/or filter the selection criteria.

For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be manipulated in one or more ways before it is stored or used, so that certain information about the user is removed. For example, a user's identity may be manipulated so that no identifying information can be determined for the user, or a user's geographic location may be generalized where location information is obtained (such as to a city, ZIP code, or state level), so that a particular location of a user cannot be determined. Thus, the user may have control over how information about the user is collected and used by a content server.

Figure 1:
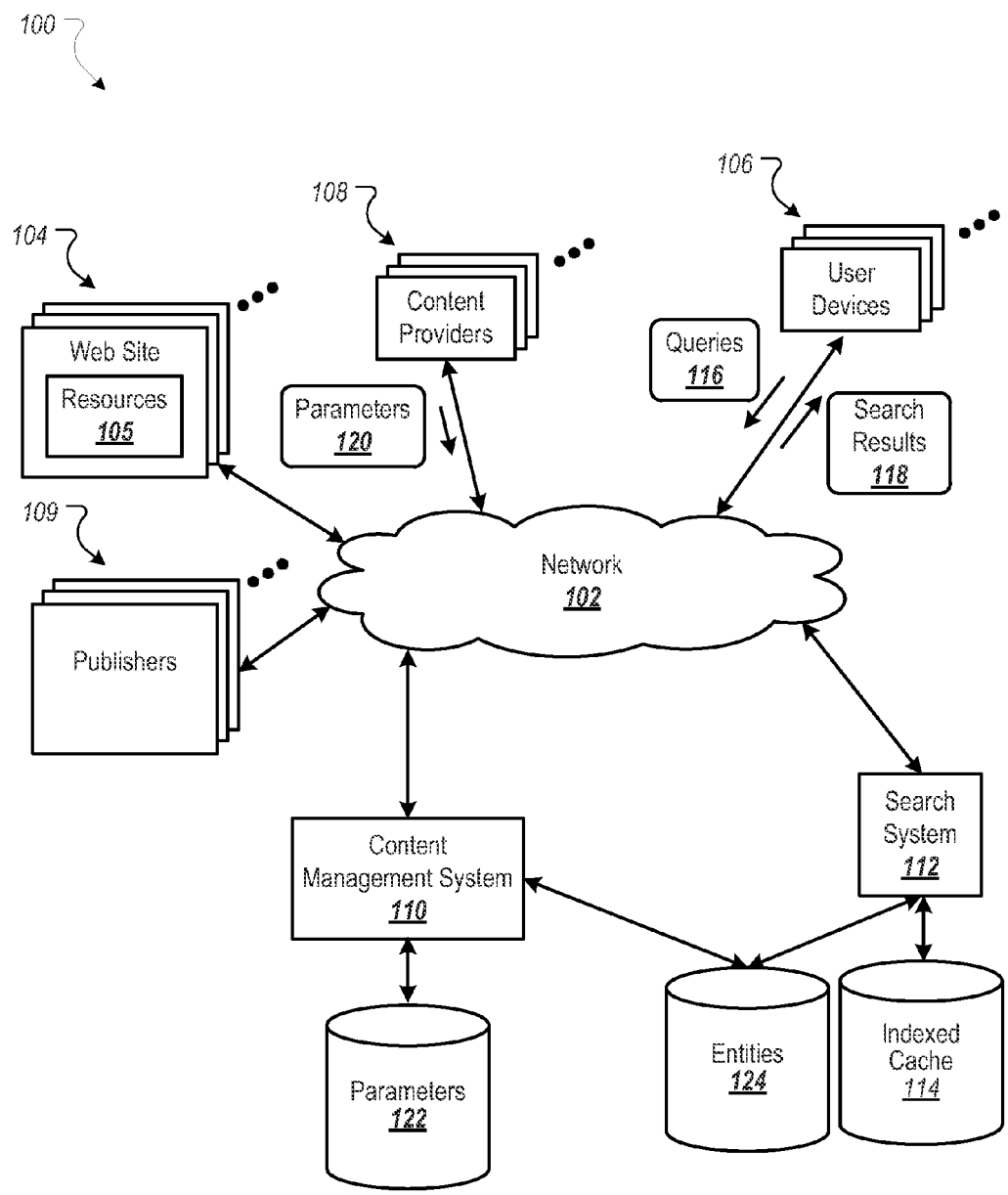
FIG. 1 is a block diagram of an example environment for providing content to a user.

FIG. 1 is a block diagram of an example environment 100 for providing content to a user. The example environment 100 includes a network 102, such as a local area network (LAN), a wide area network (WAN), the Internet, or a combination thereof. The network 102 connects websites 104, user devices 106, content providers 108, publishers 109, and a content management system 110. The example environment 100 may include many thousands of websites 104, user devices 106, content providers 108, and publishers 109. The content management system 110 may be used for selecting and providing content in response to requests for content. The content providers 108 can be, for example, advertisers. Other types of content providers are possible.

A website 104 includes one or more resources 105 associated with a domain name and hosted by one or more servers. An example website 104 is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources 105 include HTML pages, word processing documents, portable document format (PDF) documents, images, video, and news feed sources, to name only a few. The resources 105 can include content, such as words, phrases, videos, images and sounds, that may include embedded information (such as meta-information hyperlinks) and/or embedded instructions (such as scripts).

A user device 106 is an electronic device that is under control of a user and is capable of requesting and receiving resources 105 over the network 102. Example user devices 106 include personal computers, tablet computers, mobile communication devices (e.g., smartphones), televisions, set top boxes, personal digital assistants and other devices that can send and receive data over the network 102. A user device 106 typically includes one or more user applications, such as a web browser, to facilitate the sending and receiving of data over the network 102. The web browser can interact with various types of web applications, such as a game, a map application, or an e-mail application, to name a few examples.

A user device 106 can request resources 105 from a website 104. In turn, data representing the resource 105 can be provided to the user device 106 for presentation by the user device 106. User devices 106 can also submit search queries 116 to the search system 112 over the network 102. In response to a search query 116, the search system 112 can, for example, access the indexed cache 114 to identify resources 105 that are relevant to the search query 116. The search system 112 identifies the resources 105 in the form of search results 118 and returns the search results 118 to the user devices 106 in search results pages. A search result 118 is data generated by the search system 112 that identifies a resource 105 that is responsive to a particular search query 116, and includes a link to the resource 105. An example search result 118 can include a web page title, a snippet of text or a portion of an image extracted from the web page, and the URL (Unified Resource Location) of the web page.

The data representing the resource 105 or the search results 118 can also include data specifying a portion of the resource 105 or search results 118 or a portion of a user display (e.g., a presentation location of a pop-up window or in a slot of a web page) in which other content (e.g., advertisements) can be presented. These specified portions of the resource or user display are referred to as slots or impressions. An example slot is an advertisement slot.

When a resource 105 or search results 118 are requested by a user device 106, the content management system 110 may receive a request for content to be provided with the resource 105 or search results 118. The request for content can include characteristics of one or more slots or impressions that are defined for the requested resource 105 or search results 118. For example, a reference (e.g., URL) to the resource 105 or search results 118 for which the slot is defined, a size of the slot, and/or media types that are available for presentation in the slot can be provided to the content management system 110. Similarly, keywords associated with a requested resource ("resource keywords") or a search query 116 for which search results 118 are requested can also be provided to the content management system 110 to facilitate identification of content that is relevant to the resource or search query 116. Other selection criteria can also be specified.

Based, for example, on data included in the request for content, the content management system 110 can select content items that are eligible to be provided in response to the request, such as content items having characteristics matching the characteristics of a given slot. As another example, content items having selection criteria (e.g., keywords) that match the resource keywords or the search query 116 may be selected as eligible content items by the content management system 110. One or more selected content items can be provided to the user device 106 in association with providing an associated resource 105 or search results 118.

The content management system 110 can select content in response to a request for content associated with a resource 105a based at least in part on one or more entities that appear in or are associated with content of one or more other resources 105b (e.g., linked-to resources or linked-from resources) that are linked to/from the resource 105a. In general, an entity can be named and can represent, for example, a person (e.g., celebrity, president), place (e.g., national park, city), thing (e.g., ice cream, sweater), or concept (e.g., biology, motherhood). A group or category of entities can be considered to be an entity (e.g., baseball players). Other examples of entities include a product, a product category, a product manufacturer, a specific model of a product, a service, a service category, an organization, a vertical, a user intent or interest associated with a product or a service, a user activity, or an abstract idea.

The content management system 110 can, for example, identify entities that are associated with each linked-to resource 105. The content management system 110 can identify entities based on entity data from an entity data store 124. The entity data store 124 can include identifiers, definitions and other information about entities. Entity definition information can be used for identifying entities associated with a particular linked-to resource 105b. For example, data in the entity data store 124 can include keywords or other information associated with each entity that can be used by the content management system 110 for identifying entities associated with content included in a particular linked-to resource 105b. Entities and entity definitions can be hierarchical, meaning that one entity (e.g., cameras) can include other sub-entities (e.g., land cameras and digital cameras). Other relationships among entities can exist.

The content management system 110 can use the determined entities to augment and/or filter selection criteria associated with a content slot associated with the content request (i.e., to produce enhanced selection criteria). Augmenting the selection criteria can include, for example, adding one or more of the determined entities to the selection criteria. Filtering the selection criteria can include, for example, removing an entity that is explicitly included in the selection criteria. The content management system 110 can determine one or more content items in response to the request for content based on the enhanced selection criteria. The determined one or more content items can be provided to the requesting user device 106, for presentation on the user device 106.

In some implementations, the content management system 110 can select content items based at least in part on results of an auction. For example, content providers 108 can provide bids specifying amounts that the content providers 108 are respectively willing to pay for presentation of their content items. In turn, an auction can be performed and the slots can be allocated to content providers 108 according to, among other things, to their bids and/or the relevance of a content item to content presented on a page hosting the slot or a request that is received for the content item. For example, when a slot is being allocated in an auction, the slot can be allocated to the content provider 108 that provided the highest bid or a highest auction score (e.g., a score that is computed as a function of a bid and/or a quality measure). When multiple slots are allocated in a single auction, the slots can be allocated to a set of bidders that provided the highest bids or have the highest auction scores.

In some implementations, some content providers 108 prefer that the number of impressions allocated to their content and the price paid for the number of impressions be more predictable than the predictability provided by an auction. For example, a content provider 108 can increase the likelihood that its content receives a desired or specified number of impressions, for example, by entering into an agreement with a publisher 109, where the agreement requires the publisher 109 to provide at least a threshold number of impressions (e.g., 1,000 impressions) for a particular content item provided by the content provider 108 over a specified period (e.g., one week). In turn, the content provider 108, publisher 109, or both parties can provide data to the content management system 110 that enables the content management system 110 to facilitate satisfaction of the agreement.

For example, the content provider 108 can upload a content item and authorize the content management system 110 to provide the content item in response to requests for content corresponding to the website 104 of the publisher 109. Similarly, the publisher 109 can provide the content management system 110 with data representing the specified time period as well as the threshold number of impressions that the publisher 109 has agreed to allocate to the content item over the specified time period. Over time, the content management system 110 can select content items based at least in part on a goal of allocating at least a minimum number of impressions to a content item in order to satisfy a delivery goal for the content item during a specified period of time.

A content provider 108 or content sponsor can create a content campaign associated with one or more content items using tools provided by the content management system 110. For example, the content management system 110 can provide one or more account management user interfaces for creating and managing content campaigns. The account management user interfaces can be made available to the content provider 108, for example, either through an online interface provided by the content management system 110 or as an account management software application installed and executed locally at a content provider's client device.

A content provider 108 can, using the account management user interfaces, provide campaign parameters 120 which define a content campaign. The content campaign can be created and activated for the content provider 108 according to the parameters 120 specified by the content provider 108. The campaign parameters 120 can be stored in a parameters data store 122. Campaign parameters 120 can include, for example, a campaign name, a preferred content network for placing content, a budget for the campaign, start and end dates for the campaign, a schedule for content placements, content (e.g., creatives), bids, and selection criteria. Selection criteria can include, for example, a language, one or more geographical locations or websites, and/or one or more selection terms. As another example, a content provider 108 can designate one or more entities to be used as selection criteria or annotate an otherwise described selection criteria with one or more entities.

Figure 2:
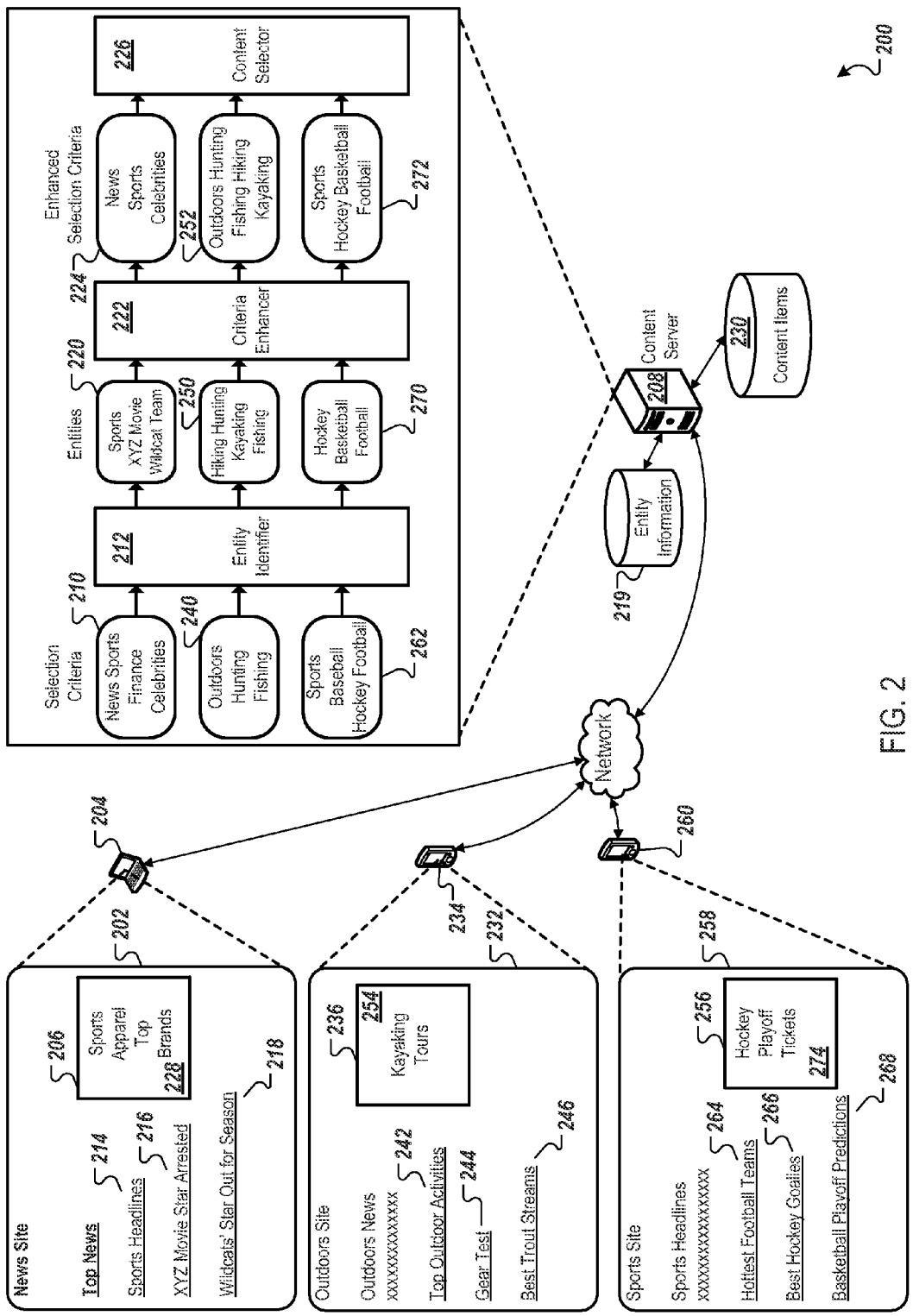
FIG. 2 is a block diagram of an example system for providing content to a user.

FIG. 2 is a block diagram of an example system 200 for providing content to a user. A news site home page resource 202 can be presented on a user device 204. In association with presentation of the resource 202, a request for content for a content slot 206 included in the resource 202 can be sent to a content server 208. The content server 208 can identify selection criteria 210 for the content slot 206. The selection criteria 210 can include, for example, keywords of "news", "sports", "finance", and "celebrities". Some or all of the keywords included in the selection criteria 210 can be associated, for example, with content included in the resource 202. As another example, some or all of the keywords included in the selection criteria 210 can be specified by a host (e.g., a publisher) associated with the resource 202.

An entity identifier 212 can process the resource 202 to identify links included in the resource 202 that link to other resources. For example, the entity identifier 212 can identify links 214, 216, and 218. The entity identifier 212 can evaluate each of the resources associated with the links 214, 216, and 218 and can use entity information from an entity information data store 219 to determine one or more entities associated with each resource. For example, each resource can be or can be associated with one or more web pages, and the entity identifier 212 can evaluate each web page associated with a resource to identify entities that are associated with content presented on the web page. For example, for the resources associated with the links 214, 216, and 218, the entity identifier can determine entities 220 of "sports", "XYZ movie", and "Wildcat team".

A criteria enhancer 222 can use the determined entities 220 to either augment or filter the selection criteria 210 to produce enhanced selection criteria 224. For example, the criteria enhancer 222 can filter the selection criteria 210 by removing an entity of "finance" that is included in the selection criteria 210. The "finance" entity can be removed, for example, based on the entity identifier 212 determining that the "finance" entity is not included in the resources associated with the links 214, 216, and 218, or that the entity "finance" appears in the resources less than a threshold number of times or otherwise has a score (e.g., a topical score) that is less than a threshold score.

The enhanced selection criteria 224 can be used by a content selector 226 to identify a content item for the content slot 206. For example, the content selector 226 can determine a content item from a content data store 228 that is associated with one or more keywords or entities that match the enhanced selection criteria 224. The selected content item can be provided to the user device 204, for presentation in the content slot 206, as illustrated by a content item 228.

Augmenting or filtering selection criteria based on entities associated with resources linked to by a resource prior to determining content for a content slot presented on the resource can result in selection of a content item that is more relevant to the resource than if the content is selected based solely on content of the resource or on original selection criteria for the content slot. For example, the selection criteria 210 for the content slot 206 includes the "finance" entity, but none of the resources linked to by the resource 202 are related to finance. Accordingly, selecting the content item 228 based on the enhanced selection criteria 224 which does not include the "finance" entity can result in the content item 228 being more relevant to the resource 202 than if a content item associated with finance is selected.

As another example, an outdoors site home page resource 232 can be presented on a user device 234. In association with presentation of the resource 232, a request for content for a content slot 236 included in the resource 232 can be sent to the content server 208. The content server 208 can identify selection criteria 240 for the content slot 206. The selection criteria 240 can include, for example, keywords of "outdoors", "hunting", and "fishing". Some or all of the keywords included in the selection criteria 240 can be associated, for example, with content included in the resource 232. As another example, some or all of the keywords included in the selection criteria 240 can be specified by a host (e.g., a publisher) associated with the resource 232.

The entity identifier 212 can process the resource 232 to identify links 242, 244, and 246 included in the resource 232 that link to other resources. The entity identifier 212 can evaluate each of the resources associated with the links 242, 244, and 246 to determine one or more entities associated with each resource. For example, for the resources associated with the links 242, 244, and 246, the entity identifier can determine entities 250 of "hiking", "hunting", "kayaking", and "fishing".

The criteria enhancer 222 can use the determined entities 250 to either augment or filter the selection criteria 250 to produce enhanced selection criteria 252. For example, the criteria enhancer 222 can augment the selection criteria 250 by adding entitles of "hiking" and "kayaking" that are included in the entities 250 to produce the enhanced selection criteria 252. The "hiking" and "kayaking" entities can be added, for example, based on the entity identifier 212 determining that the "hiking" and "kayaking" entities are not included in the selection criteria 240 and that the "hiking" and "kayaking" entities are included in the resources associated with the links 242, 244, and 246 at least a threshold number of times or otherwise have a score (e.g., a topical score) that is at least a threshold score.

The enhanced selection criteria 252 can be used by the content selector 226 to identify a content item for the content slot 236. For example, the content selector 226 can determine a content item from the content data store 228 that is associated with one or more keywords or entities that match the enhanced selection criteria 252. The selected content item can be provided to the user device 234, for presentation in the content slot 236, as illustrated by a content item 254.

In some implementations, the criteria enhancer 222 can both augment and filter selection criteria. For example, a request for content for a content slot 256 included in a resource 258 can be sent from a user device 260 to the content server 208. The content server 208 can identify selection criteria 262 for the content slot 256 which includes keywords of "sports", "baseball", "hockey", and "football".

The entity identifier 212 can process the resource 232 to identify links 264, 266, and 268 included in the resource 258 that link to other resources. The entity identifier 212 can evaluate each of the resources associated with the links 264, 266, and 268 to determine entities 270 of "hockey", "baseball", and "football". The criteria enhancer 222 can use the determined entities 270 to both augment and filter the selection criteria 262 to produce enhanced selection criteria 272. For example, the criteria enhancer 222 can augment the selection criteria 262 by adding entities of "hockey" and "basketball" to the selection criteria 262. The criteria enhancer 222 can filter the selection criteria 262 by removing the entity "baseball" from the selection criteria 262. The enhanced selection criteria 272 can be used by the content selector 226 to identify a content item for the content slot 256. For example, the content selector 226 can determine a content item from the content data store 228 that is associated with one or more keywords or entities that match the enhanced selection criteria 272. The selected content item can be provided to the user device 260, for presentation in the content slot 256, as illustrated by a content item 274.

Figure 3:
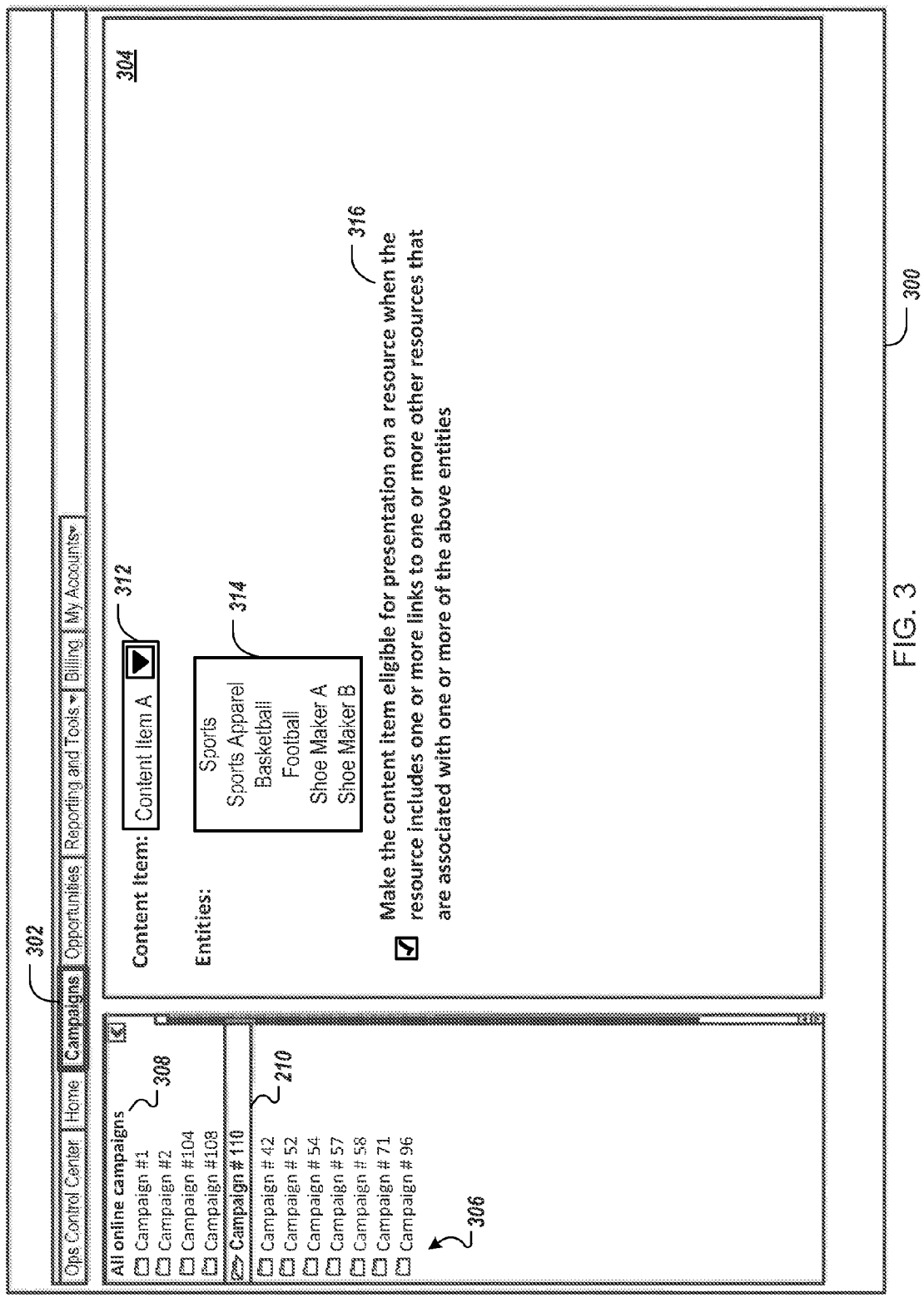
FIG. 3 illustrates an example campaign management user interface.

FIG. 3 illustrates an example campaign management user interface 300. The user interface 300 can be included, for example, in one or more user interfaces that a user, such as a content item provider or content sponsor, can use to configure a campaign. The content item provider can select a tab 302 to display a campaign configuration area 304. The content item provider can view a list 306 of campaigns by selecting a control 308. The content item provider can edit an existing campaign in the campaign configuration area 304 by selecting the name of an existing campaign (e.g., a name 310) in the campaign list 306. The content item provider can select a content item associated with the campaign using a control 312.

A control 314 lists entities that are associated with the selected content item and/or with the content item provider. The content item provider can provide (e.g., enter) some or all of the entities using the control 314. As another example, some or all of the entities in the control 314 can be automatically determined and suggested to the content item provider. For example, some or all of the entities in the control 314 can be automatically determined from one or more web pages that are associated with a web site of the content item provider or from other information provided by or otherwise associated with the content item provider. Some or all of the entities in the control 314 can be determined based on the content of the selected content item.

The content item provider can select a control 316 to configure selection criteria that indicates that the selected content item is to be eligible for presentation on a resource when the resource includes one or more links to one or more other resources that are associated with one or more of the entities listed in the control 314. A content management system can consider the selection criteria associated with the control 316 along with other factors, such as a goal of allocating at least a minimum number of impressions to the selected content item in order to satisfy a delivery goal for the content item during a specified period of time.

Figure 4:
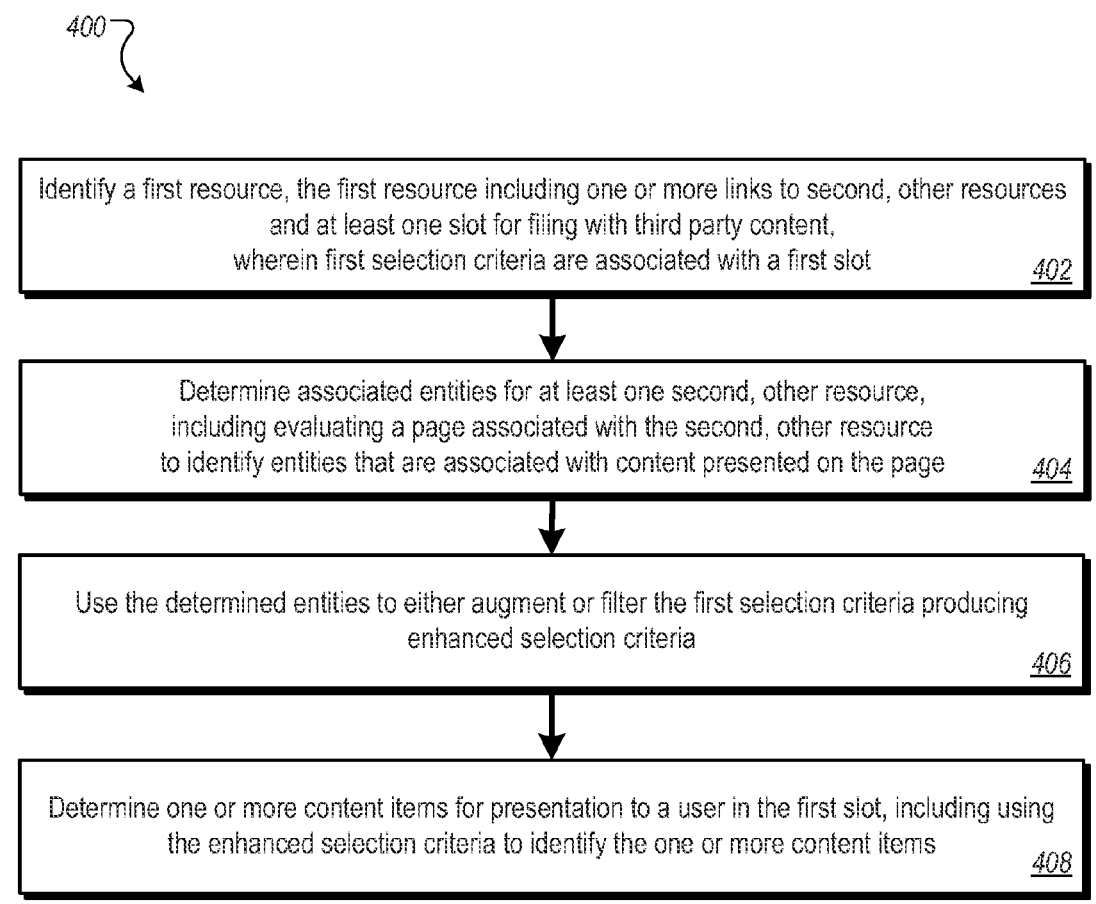
FIG. 4 is a flowchart of an example process for providing content to a user.

FIG. 4 is a flowchart of an example process 400 for providing content to a user. The process 400 can be performed, for example, by the content management system 110 described above with respect to FIG. 1.

A first resource is identified (402), wherein the first resource includes one or more links to (or from) other resources and at least one slot for filling with third party content and wherein first selection criteria are associated with a first slot. The first selection criteria can be used to determine which third party content to be included in the first slot from an inventory of available third party content items. The first selection criteria can be specified by an entity associated with the resource and/or derived based on content that is included in the resource. For example, the first selection criteria can include one or more keywords associated with content included in the resource.

Associated entities for at least one second, other resource are determined (404), including evaluating a page associated with the second, other resource to identify entities that are associated with content presented on the page. In general, an entity can be named and can represent, for example, a person (e.g., celebrity, president), place (e.g., national park, city), thing (e.g., ice cream, sweater), or concept (e.g., biology, motherhood). A group or category of entities can be considered to be an entity (e.g., baseball players). Other examples of entities include a product, a product category, a product manufacturer, a specific model of a product, a service, a service category, an organization, a vertical, a user intent or interest associated with a product or a service, a user activity, or an abstract idea. In some implementations, up to a predetermined number (e.g., three, five) of entities are determined for each other resource. In some implementations, one or more associated entities for the second, other resource are derived from a URL (Uniform Resource Locator) associated with the second, other resource.

In some implementations, the second, other resources are processed to determine the associated entities. In some implementations, the entities are determined by determining that the second, other resource has not changed since prior processing of the second, other resource and by looking up the other resource in a cache of pre-computed resource-entity associations. The resource-entity associations can be pre-computed, for example, on a periodic basis (e.g., weekly) for a predetermined number (e.g., 1,000,000) of the most popular resources. If the second, other resource is located in the resource-entity associations cache, the entities associated with the second, other resource can be retrieved from the cache. If the second, other resource is not located in the resource-entity associations cache, the second, other resource can be processed to identify entities associated with the second, other resource.

In some implementations, the entities determined across all of the second, other resources can be aggregated and a set of top entities for the second, other resources can be determined. For example, a top N (e.g., five) entities associated with the second, other resources can be determined, based, for example, on the total number of occurrences of each determined entity in the second, other resources. As another example, a set of top entities can be determined by determining which entities appear at least M (e.g., three, five, ten) times in the second, other resources. As yet another example, a set of top entities can be determined by determining which entities appear in a threshold percentage (e.g., seventy five percent) of the second, other resources.

In some implementations, other approaches can be used to filter the entities associated with the second, other resources. For example, a topical score can be determined for each entity associated with a particular second, other resource and a filtered set of entities can be determined wherein each of the filtered entities has a topical score that is greater than a threshold. A topical score can indicate, for example, a relevance of an entity to a particular second, other resource.

The determined entities are used to either augment and/or filter the first selection criteria producing enhanced selection criteria (406). When the entities associated with the second, other resources are filtered, the filtered set of entities can be used to produce the enhanced selection criteria. Augmenting the first selection criteria can include adding one or more of the entities of the determined entities to the first selection criteria. Filtering the first selection criteria can include removing an entity that is explicitly included in the first selection criteria. In some implementations and for some selection criteria, both augmenting and filtering can be performed. For example, one or more entities may be removed from the first selection criteria and one or more other entities may be added to the first selection criteria.

In some implementations, rather than remove an entity from the first selection criteria, a weight which downgrades the importance of the entity can be assigned to the entity. For example, when an entity in the first selection criteria does not appear at all in the second, other resources or appears less than a first threshold number of times (e.g., two) in the second, other resources, the entity can be removed from the first selection criteria. When an entity in the first selection criteria appears more than the first threshold number of times in the second, other resources but less than a second threshold number of times (e.g., five), a weight that downgrades the importance of the entity can be assigned to the entity. When an entity in the first selection criteria appears at least the second threshold number of times in the second, other resources, the entity can be maintained (e.g., not removed or downgraded) in the first selection criteria.

One or more content items are determined for presentation to a user in the first slot (408), wherein determining includes using the enhanced selection criteria to identify the one or more content items. For example, one or more content items that are associated with one or more keywords that match the enhanced selection criteria can be determined. In some implementations, some or all of the determined content items are advertisements that are directed to a determined entity. The resource and the one or more determined content items can be provided to a user device, for presentation on the user device.

Figure 5:
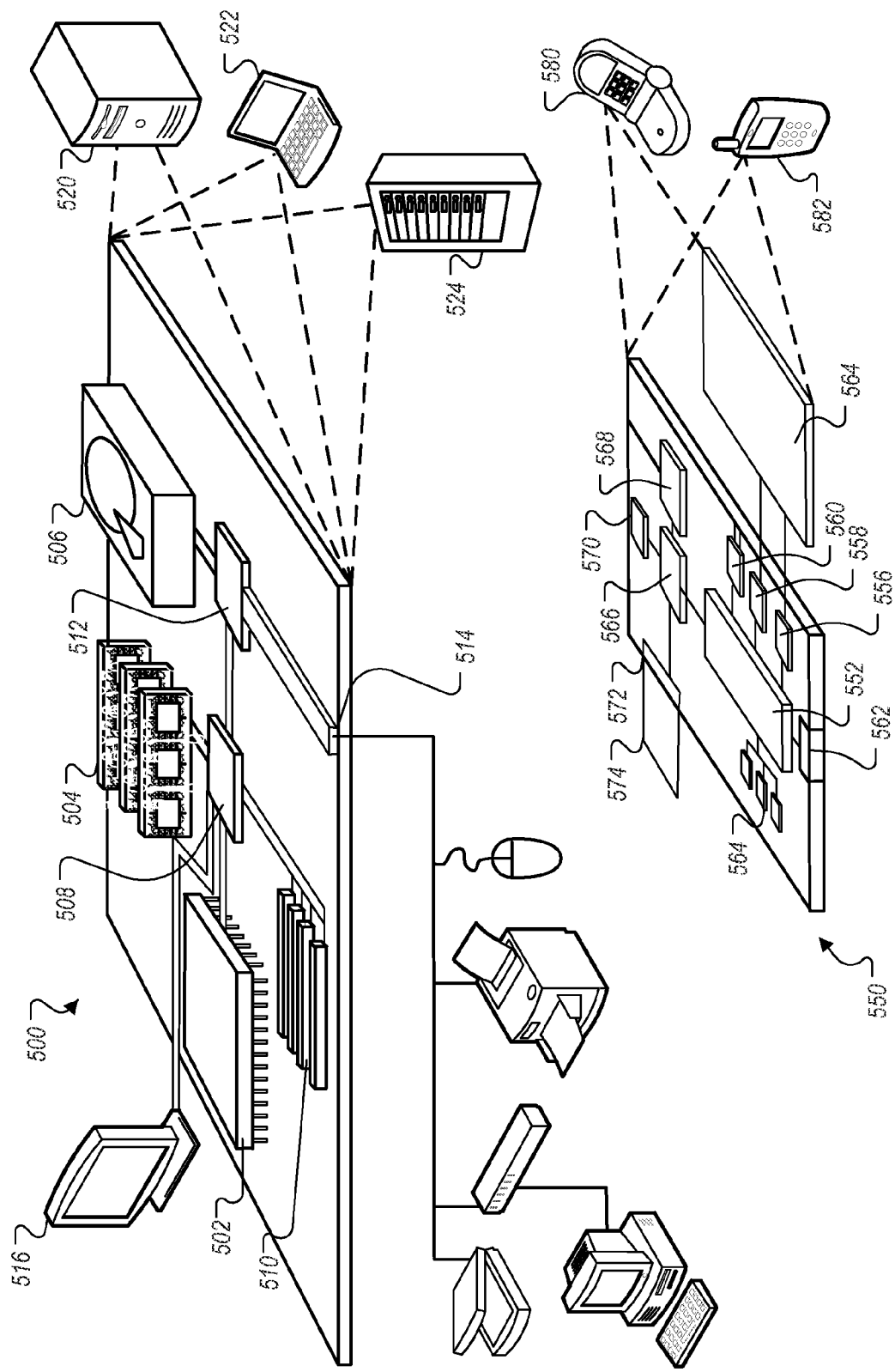
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be illustrative only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. The computer-readable medium is not a propagating signal. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is illustrative only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method comprising:
    identifying a first resource, the first resource including one or more links to second other resources and at least one slot for filling with third party content, wherein publisher-specified selection criteria are associated with a first slot of the at least one slots, the publisher-specified selection criteria being separate from content included in the first resource and used to determine which third party content is to be included in the first slot from an inventory of available third party content items;
    determining for at least one of the second other resources entities associated therewith, including evaluating a page associated with the second other resource to identify entities that are associated with content presented on the page;

producing enhanced selection criteria using the determined entities, including replacing a first criterion included in the publisher-specified selection criteria with a second criterion not included in the publisher-specified selection criteria based on the first criterion appearing in the second other resources fewer than a first threshold number of times and the second criterion appearing in the second other resources more than a second threshold number of times; and determining one or more content items for presentation to a user in the first slot, wherein determining includes using the enhanced selection criteria to identify the one or more content items.

2. The method of claim 1 further comprising determining entities for all of the second other resources and determining a predetermined number of entities based on entities associated with all of the second other resources.

3. The method of claim 1 wherein determining entities for the at least one second other resource includes determining a predetermined number of entities.

4. The method of claim 1 further comprising filtering the entities associated with the at least one second other resource to produce a filtered set of entities and wherein using the determined entities includes using only the filtered set of entities to filter the selection criteria.

5. The method of claim 1 wherein filtering includes removing an entity that is explicitly included in the selection criteria prior to using the enhanced selection criteria to determine the one or more content items.

6. The method of claim 1 wherein determining one or more content items includes determining one or more advertisements that are targeted to an entity in the determined entities.

7. The method of claim 1 wherein the selection criteria are specified by an entity associated with the first resource, derived based on content that is included in the first resource, or both.

8. The method of claim 1 wherein the associated entities are derived from a URL associated with the at least one second other resource.

9. A computer program product tangibly embodied in a non-transitory computer-readable storage device and comprising instructions that, when executed by a processor, cause the processor to:

identify a first resource, the first resource including one or more links to second other resources and at least one slot for filling with third party content, wherein publisher-specified selection criteria are associated with a first slot of the at least one slots, the publisher-specified selection criteria being separate from content included in the first resource and used to determine which third party content is to be included in the first slot from an inventory of available third party content items;

determine for at least one of the second other resources entities associated therewith, including evaluating a page associated with the second other resource to identify entities that are associated with content presented on the page;

produce enhanced selection criteria using the determined entities, including replacing a first criterion included in the publisher-specified selection criteria with a second criterion not included in the publisher-specified selection criteria based on the first criterion appearing in the second other resources fewer than a first threshold number of times and the second criterion appearing in the second other resources more than a second threshold number of times; and determine one or more content items for presentation to a user in the first slot, wherein determining includes using the enhanced selection criteria to identify the one or more content items.

10. The product of claim 9 wherein the selection criteria include one or more keywords associated with content included in the first resource and wherein filtering includes filtering out at least one of the one or more keywords.

11. The product of claim 9 wherein determining entities for the at least one second other resource includes determining a predetermined number of entities.

12. The product of claim 9 wherein filtering includes removing an entity that is explicitly included in the selection criteria prior to using the enhanced selection criteria to determine the one or more content items.

13. A system comprising:
an entity identifier;
a criteria enhancer; and
a content selector;
wherein the entity identifier is configured to:
identify a first resource, the first resource including one or more links to second other resources and at least one slot for filling with third party content, wherein publisher-specified selection criteria are associated with a first slot of the at least one slots, the publisher-specified selection criteria being separate from content included in the first resource used to determine which third party content is to be included in the first slot from an inventory of available third party content items; and determine for at least one of the second other resources entities associated therewith, including evaluating a page associated with the second other resource to identify entities that are associated with content presented on the page; and wherein the criteria enhancer is configured to:
produce enhanced selection criteria using the determined entities, including replacing the publisher-specified selection criteria with a second criterion not included in the publisher-specified selection criteria based on the first criterion appearing in the second other resources fewer than a first threshold number of times and the second criterion appearing in the second other resources more than a second threshold number of times; and wherein the content selector is configured to:
determine one or more content items for presentation to a user in the first slot, wherein determining includes using the enhanced selection criteria to identify the one or more content items.

14. The system of claim 13 wherein the selection criteria include one or more keywords associated with content included in the first resource and wherein filtering includes filtering out at least one of the one or more keywords or adding at least one keyword to the one or more keywords.

15. The system of claim 13 wherein determining entities for the at least one second other resource includes determining a predetermined number of entities.

16. The system of claim 13 wherein filtering includes removing an entity that is explicitly included in the selection criteria prior to using the enhanced selection criteria to determine the one or more content items.

* * * * *